(12) United States Patent
Tsuruhara

(10) Patent No.: US 7,291,825 B2
(45) Date of Patent: Nov. 6, 2007

(54) CAPACITANCE TYPE PHYSICAL QUANTITY SENSOR

(75) Inventor: Takao Tsuruhara, Oobu (JP)

(73) Assignee: DENSO CORPORATION, Kariya (JP)

( * ) Notice: Subject to any disclaimer, the term of this patent is extended or adjusted under 35 U.S.C. 154(b) by 93 days.

(21) Appl. No.: 11/348,260

(22) Filed: Feb. 7, 2006

(65) Prior Publication Data

US 2006/0175540 A1    Aug. 10, 2006

(30) Foreign Application Priority Data

Feb. 8, 2005    (JP) ............................. 2005-032088

(51) Int. Cl.
*H01J 40/14* (2006.01)
*G01P 15/14* (2006.01)
(52) U.S. Cl. .................... 250/214 SW; 250/214 A; 250/214 R; 73/514.32
(58) Field of Classification Search ........... 73/862.337, 73/504.02, 514.32; 250/214 SW, 214 R, 250/214 A; 324/658, 532, 662
See application file for complete search history.

(56) References Cited

U.S. PATENT DOCUMENTS

2006/0037393 A1 *   2/2006   Itakura et al. ........... 73/335.04
2006/0175540 A1 *   8/2006   Tsuruhara ............... 250/214 R
2006/0277995 A1 *  12/2006   Kutsuna .................. 73/504.02
2007/0101814 A1 *   5/2007   Campbell et al. ........ 73/514.34

OTHER PUBLICATIONS

"Single-Chip Surface Micromachined Integrated Gyroscope With 50°/h Allan Deviation" by J. A. Geen et al.; IEEE Journal of Solid-State Circuits, vol. 37, No. 12; Dec. 2002 (discussed on p. 1 in the spec.).
U.S. Appl. No. 11/253,802 filed Oct. 20, 2005.

* cited by examiner

*Primary Examiner*—Georgia Epps
*Assistant Examiner*—Tony Ko
(74) *Attorney, Agent, or Firm*—Posz Law Group, PLC

(57) ABSTRACT

The capacitance type physical quantity sensor has a sensing part including a capacitor element generating a capacitance signal representing a magnitude of a physical quantity to be sensed, and a sensor circuit including a charge amplifier converting the capacitance signal into a voltage signal. The charge amplifier includes an operational amplifier applied with the capacitance signal at an inverting input terminal thereof and applied with a reference voltage at a non-inverting input terminal thereof, a first capacitor connected between the inverting input terminal and an output terminal of the operational amplifier, a feedback resistor connected in parallel to the first capacitor, and a switch connected in parallel to the first capacitor and configured to be closed to make a short circuit between the inverting input terminal and the output terminal upon receiving a refresh signal supplied from outside.

3 Claims, 2 Drawing Sheets

CAPACITANCE TYPE PHYSICAL QUANTITY SENSOR

CROSS-REFERENCE TO RELATED APPLICATION

This application is related to Japanese Patent Application No. 2005-32088 filed on Feb. 8, 2005, the contents of which are hereby incorporated by reference.

BACKGROUND OF THE INVENTION

1. Field of the Invention

The present invention relates to a capacitance-type physical quantity sensor provided with a sensor circuit including at least one charge amplifier for converting a capacitance signal into a voltage signal.

2. Description of Related Art

There is known, as such a capacitance type physical quantity sensor, a vibration type gyro sensor (refer to IEEE JOURNAL OF SOLID-STATE CIRCUITS VOL. 37 NO. 12 "Single-Chip Surface Micromachined Integrated Gyroscope With 50°/h Allan Deviation", for example). In the gyro sensor of this type, detection signals outputted from a vibrator as complementary capacitance signals are converted into voltage signals by charge amplifiers, and then supplied to a differential amplifier. The differential between the voltage signals amplified by the differential amplifier undergoes synchronous detection, zero-point adjustment, temperature-characteristic compensation, etc. to make a sensor output signal.

The charge amplifier of such a gyro sensor is constituted by an operational amplifier which needs a feedback resistor of high resistance. FIG. 3 is a circuit diagram of a conventional charge amplifier usable for such a gyro sensor.

As shown in this figure, the charge amplifier is constituted by an operational amplifier J1 applied with a detection signal (capacitance signal) at its inverting input terminal and applied with a reference voltage at its non-inverting input terminal. A capacitor J2 and a MOS resistor J3 as a feedback resistor are connected in parallel between the inverting input terminal and output terminal of the operational amplifier J1.

The MOS resistor J3 is constituted by a series of MOS transistors J4 and J5, a capacitor J6 connected at one terminal thereof to a node of the MOS transistors J4, J5, a MOS transistor J7 whose gate is connected to the source thereof and to the gates of the MOS transistors J4, J5, and a constant current source J8 connected between the source of the MOS transistor J7 and the ground. The other terminal of the capacitor J6 and the drain of the MOS transistor J7 are applied with the reference voltage.

By controlling the current drawn by the constant current source J8, on which the resistances of the MOS transistors J4, J5 are dependent, it is possible that the MOS resistor J3 has a desired high resistance.

However, a refresh time (a time period required for the electric charge accumulated in the capacitor J2 to be discharged) of the charge amplifier having the above described structure is considerably long, because the time constant of the CR circuit formed by the capacitor J2 and the MOS resistor J3 is large due to the high resistance of the MOS resistor J3. This poses a problem that the time necessary for carrying out inspection of a wafer on which a sensor circuit including charge amplifiers having the structure as described above is formed becomes long, because the charge amplifiers have to be refreshed to check their offset values in this inspection.

SUMMARY OF THE INVENTION

The present invention provides a capacitance type physical quantity sensor comprising:

a sensing part including a capacitor element whose capacitance varies depending on a physical quantity to be sensed, the sensing part generating a capacitance signal representing a magnitude of the capacitance of the capacitor element; and a sensor circuit including a charge amplifier converting the capacitance signal into a voltage signal;

wherein the charge amplifier includes an operational amplifier applied with the capacitance signal at an inverting input terminal thereof and applied with a reference voltage at a non-inverting input terminal thereof, a first capacitor connected between the inverting input terminal and an output terminal of the operational amplifier, a feedback resistor connected in parallel to the first capacitor, and a switch connected in parallel to the first capacitor and configured to be closed to make a short circuit between the inverting input terminal and the output terminal upon receiving a refresh signal supplied from outside of the capacitance type physical quantity sensor.

According to the present invention, the time required for carrying out an inspection of a wafer on which a capacitance type physical quantity sensor including at least one charge amplifier is formed can be shortened, because the capacitor connected between the inverting input terminal and the output terminal of the operational amplifier constituting the charge amplifier can be discharged instantly by closing the switch connected in parallel to the capacitor regardless of the value of the time constant of the CR circuit formed by this capacitor and the feedback resistor.

PREFERRED EMBODIMENTS OF THE INVENTION

Figure 1:
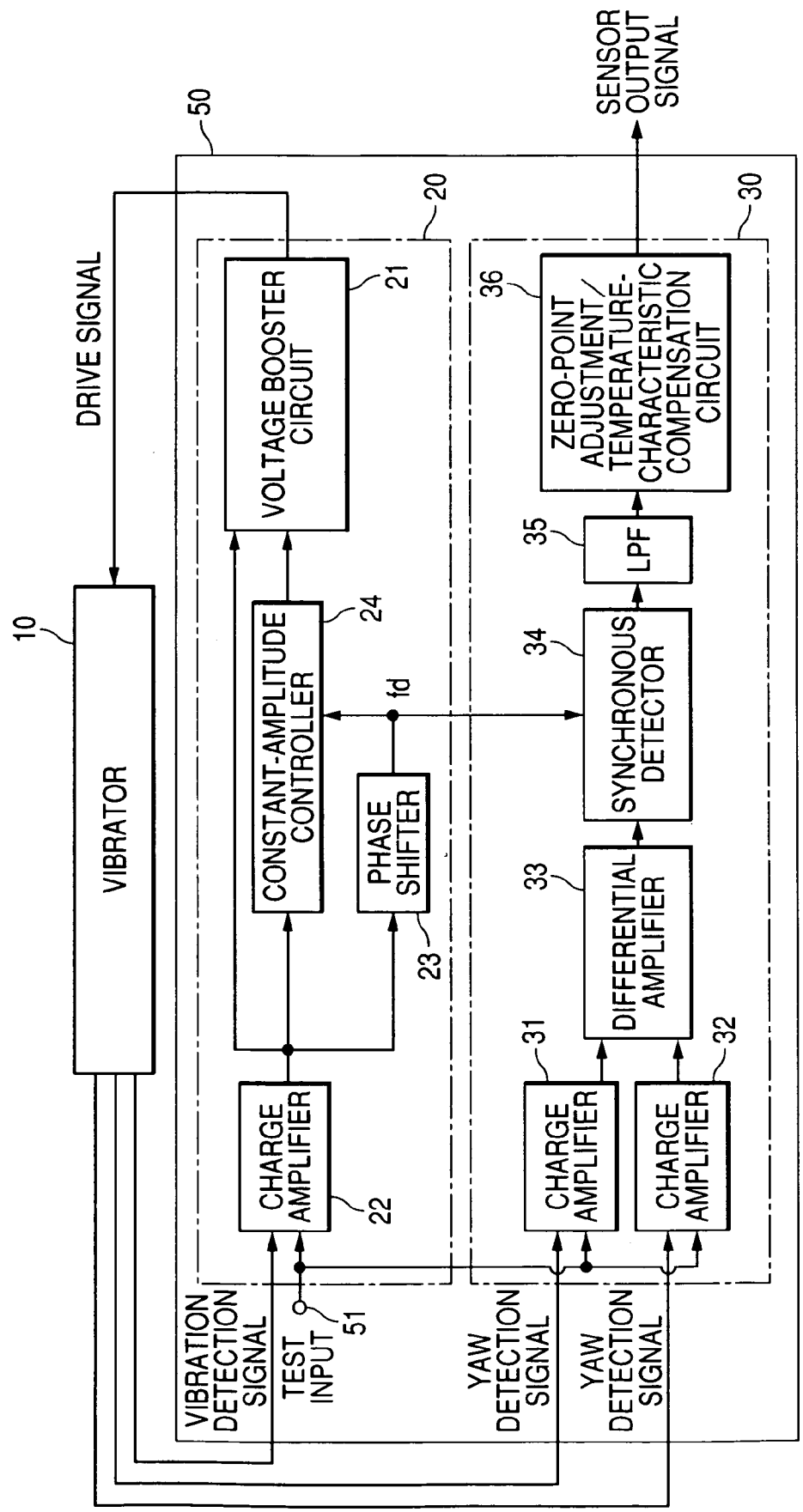
FIG. 1 is a block diagram showing a structure of a capacitance type physical quantity sensor according to an embodiment of the invention.

FIG. 1 is a block diagram showing a structure of a capacitance type physical quantity sensor according to an embodiment of the invention. This capacitance type physical quantity sensor includes a vibrator 10, and a sensor circuit including a driver circuit 20 and a yaw detector circuit 30 which are mounted on a circuit board 50.

The vibrator 10 is provided with a driving element applied with a drive signal outputted from the driver circuit 20 to drive the vibrator 10 to vibrate in a predetermined driving direction, a capacitor element serving as a vibration detecting element which has a capacitance varying depending on a vibration of the vibrator 10 in the driving direction and outputs a capacitance signal as a vibration detection signal representing the magnitude of the vibration of the vibrator 10 in the driving direction, and a pair of capacitance elements serving as a pair of yaw detecting elements which have capacitances complementarily varying depending on a vibration of the vibrator 10 in a sensing direction perpendicular to the driving direction and output complementary capacitance signals as yaw detection signals representing a magnitude of the vibration of the vibrator 10 in the sensing direction. The vibration of the vibrator 10 in the sensing direction is caused by the Coriolis force which occurs when the vibrator 10 vibrating in the driving direction undergoes yaw movement.

The driver circuit 20 includes a charge amplifier 22, a phase shifter 23, a constant-amplitude controller 24, and a voltage booster circuit 21. The charge amplifier 22 converts the vibration detection signal outputted from the vibration detecting element into a voltage signal. The phase shifter 23 phase-shifts the voltage signal outputted from the charge amplifier 23. The constant-amplitude controller 24 generates, on the basis of the voltage signal outputted from the charge amplifier 22 and the phase-shifted voltage signal outputted from the phase shifter 23, a control signal used for keeping the drive signal applied to the driving element at a constant amplitude and a constant phase difference with respect to the vibration detection signal.

The voltage booster circuit 21 generates, on the basis of the control signal outputted from the constant-amplitude controller 24, the drive signal of a certain frequency fd having the constant amplitude and the constant phase difference with respect to the vibration detection signal by boosting the voltage signal outputted from the charge amplifier 22 as a feedback signal.

The yaw detector circuit 30, which is for generating a sensor output signal, includes charge amplifiers 31, 32, a differential amplifier 33, a synchronous detector 34, a low-pass filter 35, and a zero-point adjustment/temperature-characteristic compensation circuit 36.

The charge amplifiers 31, 32 convert the complementary capacitance signals outputted from the yaw detecting elements as yaw detection signals into voltage signals.

The differential amplifier 33 amplifies the differential between these two voltage signals, and outputs it to the synchronous detector 34. The signal outputted from the differential amplifier 33 is an ac voltage signal containing an offset voltage as a dc component.

The synchronous detector 34 detects, from this ac voltage signal, a component which is in synchronous with the phase-shifted voltage signal having the frequency fd outputted from the phase shifter 23, and outputs it to the low-pass filter 35.

The low-pass filter 35 is for eliminating, from the output of the synchronous detector 34, components that has a frequency higher than a predetermined frequency.

The zero-point adjustment/temperature-characteristic compensation circuit 36 performs zero-point adjustment and temperature-characteristic compensation on the signal outputted from the low-pass filter 35 to thereby generate the sensor output signal.

Figure 2:
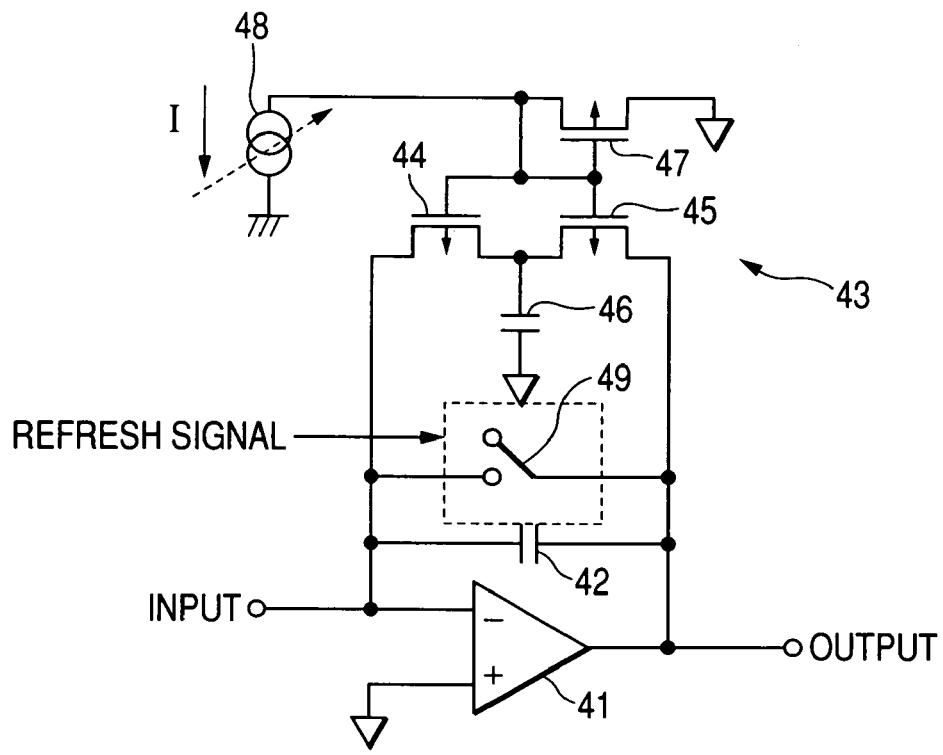
FIG. 2 is a circuit diagram of charge amplifiers included in the capacitance type physical quantity sensor according to the embodiment of the invention.
Figure 3:
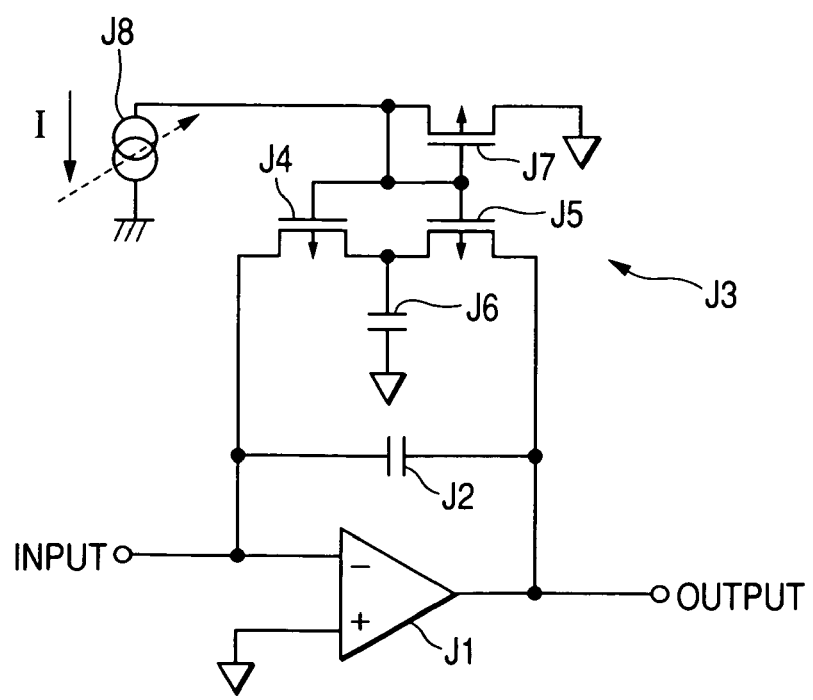
FIG. 3 is a circuit diagram of a charge amplifier included in a conventional capacitance type physical quantity sensor.

Next, the structure of the charge amplifiers 22, 31, 32 of the driver circuit 20 and the yaw detector circuit 30 is explained. These charge amplifiers 22, 31, 32 have the same circuitry as shown in FIG. 2.

Each of the charge amplifiers 22, 31, 32 is constituted by an operational amplifier 41 applied with a detection signal (capacitance signal) at its inverting input terminal and applied with a reference voltage at its non-inverting input terminal. A capacitor 42 and a MOS resistor 43 are connected in parallel between the inverting input terminal and the output terminal of the operational amplifier 41.

The MOS resistor 43 is constituted by a series of MOS transistors 44 and 45, a capacitor 46 connected to a node of the MOS transistors 44, 45 at one terminal thereof, a MOS transistor 47 whose gate is connected to the source thereof and to the gates of the MOS transistors 44, 45, and a constant current source 48 connected between the source of the MOS transistor 47 and the ground. The other terminal of the capacitor 46 and the drain of the MOS transistor 47 are applied with the reference voltage.

In this embodiment, a switch 49 is additionally connected in parallel to the capacitor 42. The switch 49 is configured to be closed upon receiving a refresh signal which is supplied from outside through a test input pad 51 (see FIG. 1) provided in the circuit board 50.

By controlling the current drawn by the constant current source 48, on which the resistances of the MOS transistors 44, 45 are dependent, it is possible that the MOS resistor 43 has a desired high resistance as a feedback resistance.

On the other hand, by closing the switch 49 by use of the refresh signal to thereby make a short circuit between the inverting input terminal and the output terminal of the operational amplifier 41, it is possible to discharge the capacitor 42 instantly for refreshing the operational amplifier 41 regardless of the value of the time constant of the CR circuit formed by the MOS resistor 43 and the capacitor 42.

Accordingly, with this embodiment, the time required for carrying out an inspection of an wafer on which a capacitance type physical quantity sensor including charge amplifiers can be shortened.

It should be noted that the present invention is applicable to any physical quantity sensor other than the gyro sensor as described above, if it has at least one charge amplifier having the structure as described above.

The above explained preferred embodiments are exemplary of the invention of the present application which is described solely by the claims appended below. It should be understood that modifications of the preferred embodiments may be made as would occur to one of skill in the art.

What is claimed is:

1. A capacitance type physical quantity sensor comprising:
    a sensing part including a capacitor element whose capacitance varies depending on a physical quantity to be sensed, said sensing part generating a capacitance signal representing a magnitude of said capacitance of said capacitor element; and
    a sensor circuit including a charge amplifier converting said capacitance signal into a voltage signal;
    wherein said charge amplifier includes an operational amplifier applied with said capacitance signal at an inverting input terminal thereof and applied with a reference voltage at a non-inverting input terminal thereof, a first capacitor connected between said inverting input terminal and an output terminal of said operational amplifier, a feedback resistor connected in parallel to said first capacitor, and a switch connected in parallel to said first capacitor and configured to be closed to make a short circuit between said inverting input terminal and said output terminal upon receiving a refresh signal supplied from outside of said capacitance type physical quantity sensor.

2. The capacitance type physical quantity sensor according to claim 1, wherein said feedback resistor is constituted by a series of a first MOS transistor and a second MOS transistor, a second capacitor connected to a node of said first and second MOS transistors at one terminal thereof, a third MOS transistor whose gate is connected to a source thereof and to gates of said first and second MOS transistors, and a constant current source connected between said source of said third MOS transistor and a ground, a drain of said third MOS transistor and the other terminal of said second capacitor being applied with said reference voltage.

3. The capacitance type physical quantity sensor according to claim 1, further comprising a test input pad formed in a circuit board on which said sensor circuit is mounted, said refresh signal being supplied to said charge amplifier through said test input pad.

\* \* \* \* \*